US008687143B2

(12) United States Patent
Feng et al.

(10) Patent No.: US 8,687,143 B2

(45) Date of Patent: Apr. 1, 2014

(54) MULTI-PRIMARY DISPLAY WITH AREA ACTIVE BACKLIGHT

(75) Inventors: Xiaofan Feng, Camas, WA (US); Dan Zhang, Rochester, NY (US)

(73) Assignee: Sharp Laboratories of America, Inc., Camas, WA (US)

( * ) Notice: Subject to any disclaimer, the term of this patent is extended or adjusted under 35 U.S.C. 154(b) by 464 days.

(21) Appl. No.: 12/972,928

(22) Filed: Dec. 20, 2010

(65) Prior Publication Data

US 2012/0154708 A1 Jun. 21, 2012

(51) Int. Cl.
*G02F 1/1335* (2006.01)

(52) U.S. Cl.
USPC .............................................. 349/61; 349/64

(58) Field of Classification Search
USPC ...................................................... 349/61–65
See application file for complete search history.

(56) References Cited

U.S. PATENT DOCUMENTS

| | | | | |
|---|---|---|---|---|
| 6,633,302 | B1 | 10/2003 | Ohsawa et al. | |
| 7,199,839 | B2 | 4/2007 | Kim | |
| 7,592,996 | B2 | 9/2009 | Brown Elliott et al. | |
| 2005/0083352 | A1 | 4/2005 | Higgins | |
| 2006/0262078 | A1 | 11/2006 | Inuzuka et al. | |
| 2007/0001994 | A1 | 1/2007 | Roth | |
| 2008/0204479 | A1 | 8/2008 | Seetzen | |
| 2009/0174638 | A1* | 7/2009 | Brown Elliott et al. | 345/88 |
| 2010/0052575 | A1 | 3/2010 | Feng et al. | |
| 2010/0134524 | A1 | 6/2010 | Hayashi et al. | |
| 2010/0238189 | A1* | 9/2010 | Feng | 345/589 |
| 2010/0253711 | A1* | 10/2010 | Muroi | 345/690 |

FOREIGN PATENT DOCUMENTS

WO 2010085505 A1 7/2010

OTHER PUBLICATIONS

International Search Report dated Mar. 19, 2012, Japanese International App. No. PCT/JP2011/079274, Sharp Kabushiki Kaisha, 7 pp.

* cited by examiner

*Primary Examiner* — Edward Glick
*Assistant Examiner* — David Chung
(74) *Attorney, Agent, or Firm* — Chernoff Vilhauer McClung & Stenzel, LLP

(57) ABSTRACT

A method of illuminating a display includes spatially varying the luminance of a multi-colored light source illuminating a plurality of pixels of the display in response to receiving a plurality of pixel values, and varying the transmittance of a light valve of the display having filters corresponding to the multi-colored light source in response to receiving the plurality of pixel values. The illumination is modified for a plurality of pixel values based upon modification of the luminance of the light source and varying the transmittance of the light valve. The modifying is further based upon modification of at least one of the multi-colored light sources together with modification of the transmittance of the light valve corresponding to at least one of the filters of a different color than the at least one of the multi-colored light sources in such a manner that increases the color gamut of the display.

19 Claims, 6 Drawing Sheets

HDR DISPLAY WITH LED BACKLIGHT

FIG. 1 HDR DISPLAY WITH LED BACKLIGHT

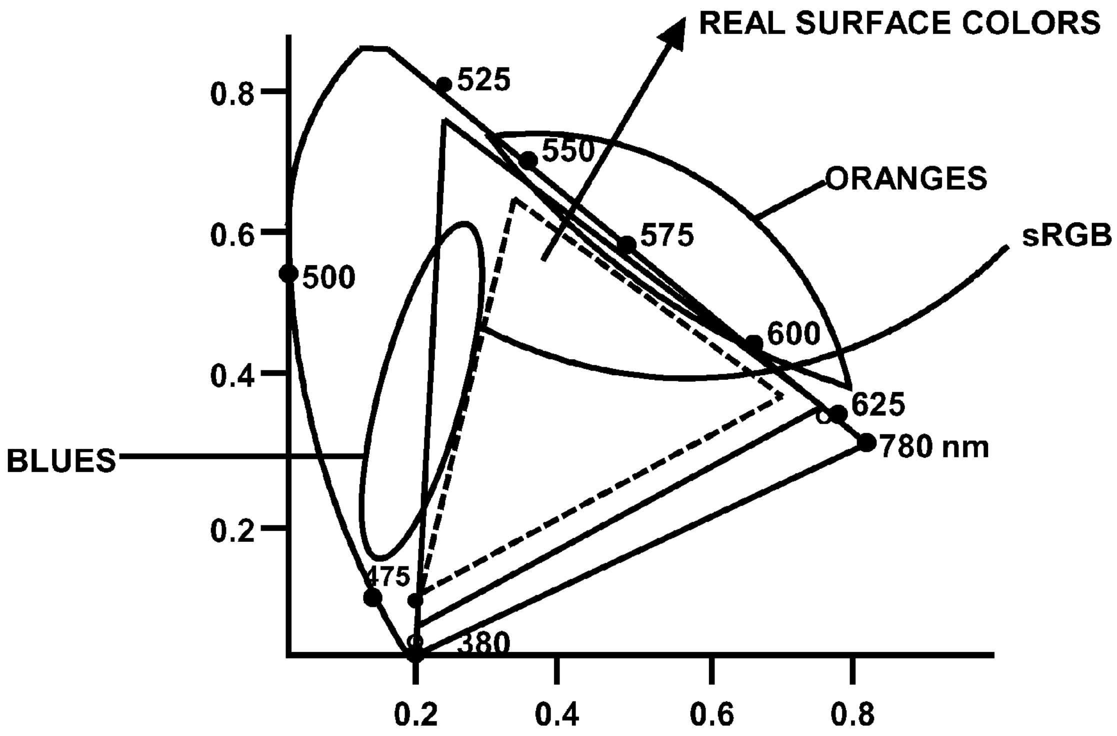
FIG. 3 COLOR GAMUT

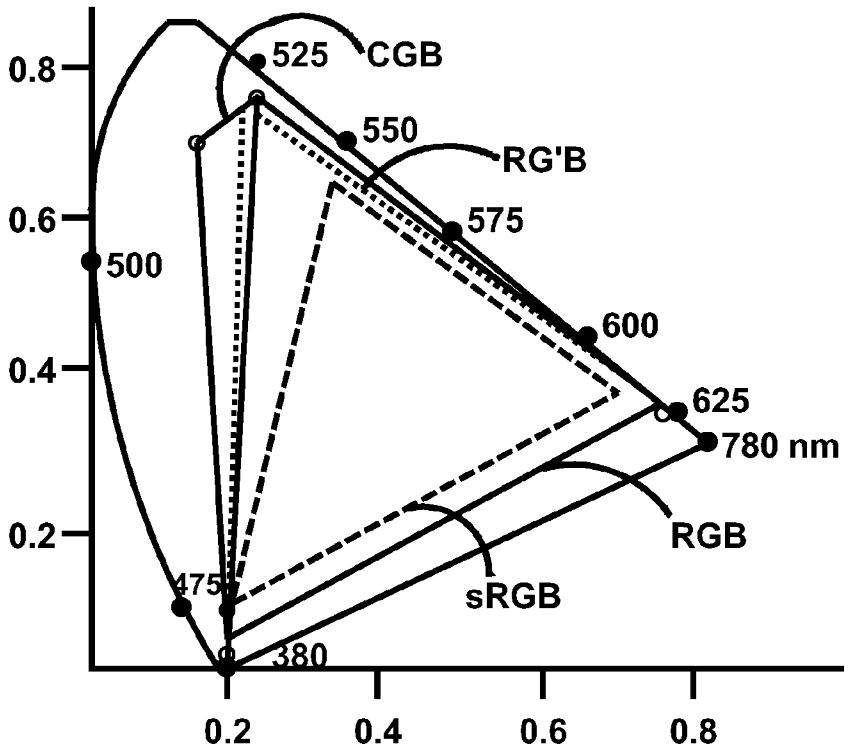
FIG. 4 CHROMATICITY DIAGRAM OF ACTIVE AREA RGB LED BACKLIGHT DISPLAY

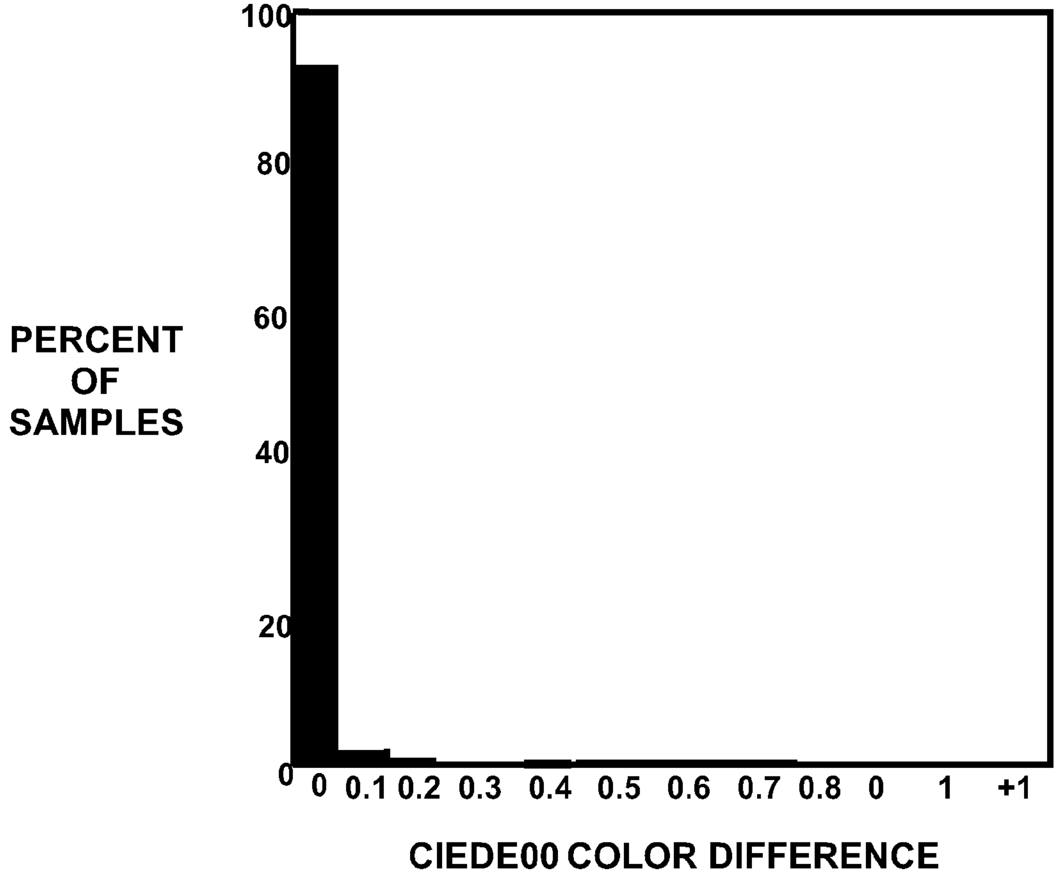
FIG 5. COLOR DIFFERENCE HISTOGRAM

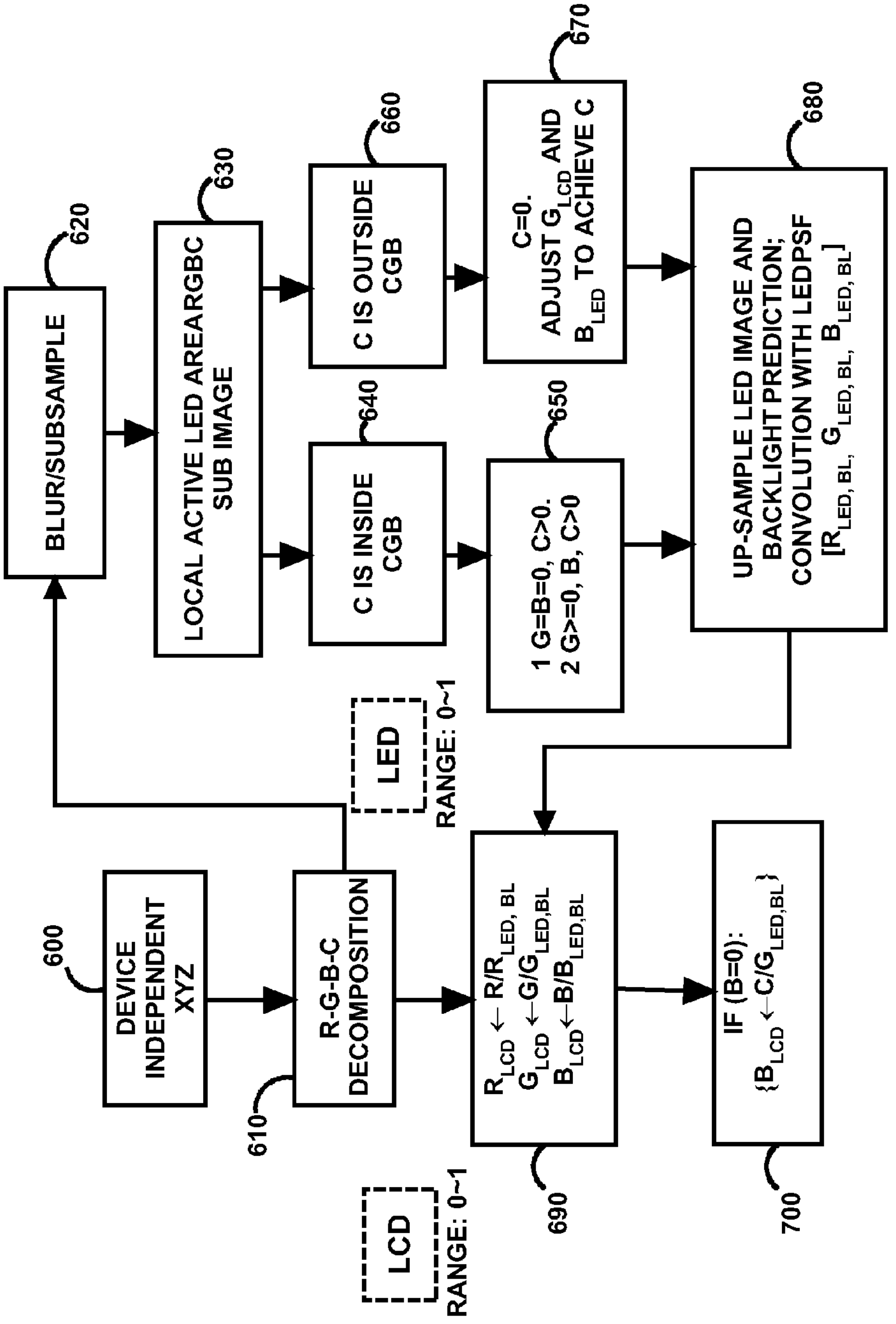
FIG. 6 RENDERING RGBC TO $RGB_{LED}$ AND $RGB_{LCD}$

MULTI-PRIMARY DISPLAY WITH AREA ACTIVE BACKLIGHT

CROSS-REFERENCE TO RELATED APPLICATIONS

None.

BACKGROUND OF THE INVENTION

The present invention relates to backlit displays and, more particularly, to a backlit display with improved color.

The local transmittance of a liquid crystal display (LCD) panel or a liquid crystal on silicon (LCOS) display can be varied to modulate the intensity of light passing from a backlit source through an area of the panel to produce a pixel that can be displayed at a variable intensity. Whether light from the source passes through the panel to an observer or is blocked is determined by the orientations of molecules of liquid crystals in a light valve.

Since liquid crystals do not emit light, a visible display requires an external light source. Small and inexpensive LCD panels often rely on light that is reflected back toward the viewer after passing through the panel. Since the panel is not completely transparent, a substantial part of the light is absorbed during its transits of the panel and images displayed on this type of panel may be difficult to see except under the best lighting conditions. On the other hand, LCD panels used for computer displays and video screens are typically backlit with flourescent tubes or arrays of light-emitting diodes (LEDs) that are built into the sides or back of the panel. To provide a display with a more uniform light level, light from these point or line sources is typically dispersed in a diffuser panel before impinging on the light valve that controls transmission to a viewer.

The transmittance of the light valve is controlled by a layer of liquid crystals interposed between a pair of polarizers. Light from the source impinging on the first polarizer comprises electromagnetic waves vibrating in a plurality of planes. Only that portion of the light vibrating in the plane of the optical axis of a polarizer can pass through the polarizer. In an LCD the optical axes of the first and second polarizers are arranged at an angle so that light passing through the first polarizer would normally be blocked from passing through the second polarizer in the series. However, a layer of translucent liquid crystals occupies a cell gap separating the two polarizers. The physical orientation of the molecules of liquid crystal can be controlled and the plane of vibration of light transiting the columns of molecules spanning the layer can be rotated to either align or not align with the optical axes of the polarizers.

The surfaces of the first and second polarizers forming the walls of the cell gap are grooved so that the molecules of liquid crystal immediately adjacent to the cell gap walls will align with the grooves and, thereby, be aligned with the optical axis of the respective polarizer. Molecular forces cause adjacent liquid crystal molecules to attempt to align with their neighbors with the result that the orientation of the molecules in the column spanning the cell gap twist over the length of the column. Likewise, the plane of vibration of light transiting the column of molecules will be "twisted" from the optical axis of the first polarizer to that of the second polarizer. With the liquid crystals in this orientation, light from the source can pass through the series polarizers of the translucent panel assembly to produce a lighted area of the display surface when viewed from the front of the panel.

To darken a pixel and create an image, a voltage, typically controlled by a thin film transistor, is applied to an electrode in an array of electrodes deposited on one wall of the cell gap. The liquid crystal molecules adjacent to the electrode are attracted by the field created by the voltage and rotate to align with the field. As the molecules of liquid crystal are rotated by the electric field, the column of crystals is "untwisted," and the optical axes of the crystals adjacent the cell wall are rotated out of alignment with the optical axis of the corresponding polarizer progressively reducing the local transmittance of the light valve and the intensity of the corresponding display pixel. Color LCD displays are created by varying the intensity of transmitted light for each of a plurality of primary color elements (typically, red, green, and blue) that make up a display pixel.

Unfortunately, the color gamut of a display with three primary color elements is sufficiently limited to result in insufficient colors to render a natural scene.

BRIEF DESCRIPTION OF THE SEVERAL VIEWS OF THE DRAWINGS

FIG. 3 illustrates a chromaticity diagram of a display with RGB primary.

FIG. 4 illustrates a chromaticity diagram of a display with RGBC primary.

FIG. 5 illustrates a color difference histogram.

FIG. 6 illustrates rendering RGBC to $RGB_{LED}$ and $RGB_{LCD}$.

DETAILED DESCRIPTION OF PREFERRED EMBODIMENT

Figure 1:
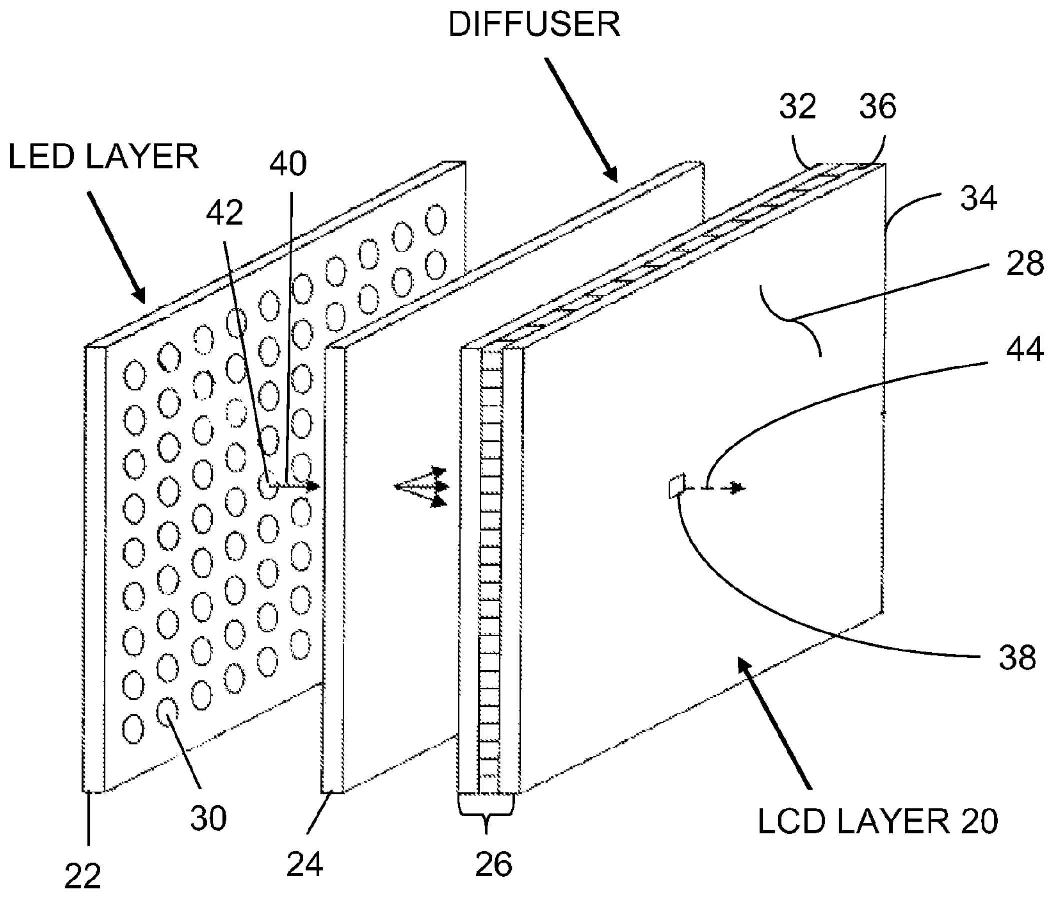
FIG. 1 illustrates a display with a backlight.

Referring to FIG. 1, a backlit display 20 comprises, generally, a backlight 22, a diffuser 24, and a light valve 26 (indicated by a bracket) that controls the transmittance of light from the backlight 22 to a user viewing an image displayed at the front of the panel 28. The light valve, typically comprising a liquid crystal apparatus, is arranged to electronically control the transmittance of light for a picture element or pixel. Since liquid crystals do not emit light, an external source of light is necessary to create a visible image. The backlight 22 comprises flourescent light tubes or an array of light sources 30 (e.g., light-emitting diodes (LEDs)), as illustrated in FIG. 1, and/or edge based illumination sources, is necessary to produce pixels of sufficient intensity for highly visible images or to illuminate the display in poor lighting conditions. There may not be a light source 30 for each pixel of the display and, therefore, the light from the point or line sources is typically dispersed by a diffuser panel 24 so that the lighting of the front surface of the panel 28 is more uniform.

Light radiating from the light sources 30 of the backlight 22 comprises electromagnetic waves vibrating in random planes. Only those light waves vibrating in the plane of a polarizer's optical axis can pass through the polarizer. The light valve 26 includes a first polarizer 32 and a second polarizer 34 having optical axes arrayed at an angle so that normally light cannot pass through the series of polarizers. Images are displayable with an LCD because local regions of a liquid crystal layer 36 interposed between the first 32 and second 34 polarizer can be electrically controlled to alter the alignment of the plane of vibration of light relative of the optical axis of a polarizer and, thereby, modulate the transmittance of local regions of the panel corresponding to individual pixels 36 in an array of display pixels.

The layer of liquid crystal molecules 36 occupies a cell gap having walls formed by surfaces of the first 32 and second 34 polarizers. The walls of the cell gap are rubbed to create microscopic grooves aligned with the optical axis of the corresponding polarizer. The grooves cause the layer of liquid crystal molecules adjacent to the walls of the cell gap to align with the optical axis of the associated polarizer. As a result of molecular forces, each succeeding molecule in the column of molecules spanning the cell gap will attempt to align with its neighbors. The result is a layer of liquid crystals comprising innumerable twisted columns of liquid crystal molecules that bridge the cell gap. As light 40 originating at a light source element 42 and passing through the first polarizer 32 passes through each translucent molecule of a column of liquid crystals, its plane of vibration is "twisted" so that when the light reaches the far side of the cell gap its plane of vibration will be aligned with the optical axis of the second polarizer 34. The light 44 vibrating in the plane of the optical axis of the second polarizer 34 can pass through the second polarizer to produce a lighted pixel 38 at the front surface of the display 28.

To darken the pixel 38, a voltage is applied to a spatially corresponding electrode of a rectangular array of transparent electrodes deposited on a wall of the cell gap. The resulting electric field causes molecules of the liquid crystal adjacent to the electrode to rotate toward alignment with the field. The effect is to "untwist" the column of molecules so that the plane of vibration of the light is progressively rotated away from the optical axis of the polarizer as the field strength increases and the local transmittance of the light valve 26 is reduced. As the transmittance of the light valve 26 is reduced, the pixel 38 progressively darkens until the maximum extinction of light 40 from the light source 42 is obtained. Color LCD displays are created by varying the intensity of transmitted light for each of a plurality of primary color elements (typically, red, green, and blue) elements making up a display pixel.

Conventional red-blue-green light sources, and the associated color gamut resulting from each of these primaries does not cover all color gamut of the natural world in a sufficient manner, especially in yellow and cyan regions of the color gamut. One technique to increase the color gamut of the display is to include additional light sources with additional different colors. For example, a cyan primary and yellow primary light source may be included, together with appropriate color filters, to increase the color gamut of the display. Unfortunately, the increase in the color gamut of the display as a result of additional primaries may require the use of additional expensive color filter masks, increases the complexity of the display, and reduces the aperture ratio of the display as the result of the additional sub-pixels.

To increase the effective color gamut of the display, the crosstalk between selected colors of the backlight in combination with different corresponding filter colors may be expressly included in the determination of the state of the backlight and/or liquid crystal layer, as opposed to being expressly or implicitly ignored, in a manner to suitably display an image on the display. As previously described, FIG. 1 illustrates a display with a light emitting diode layer used as a backlight for the liquid crystal material. The light from the array of LEDs passes through the diffusion layer and illuminates the LCD. The backlight image may be characterized as bl(x,y)=LED(i,j)*psf(x,y) (Equation 1) where LED(i,j) is the LED output level of each LED, and psf(x,y) is the point spread function of the diffusion layer, where * denotes convolution operation. The backlight image is further modulated by the liquid crystal layer.

Figure 2:
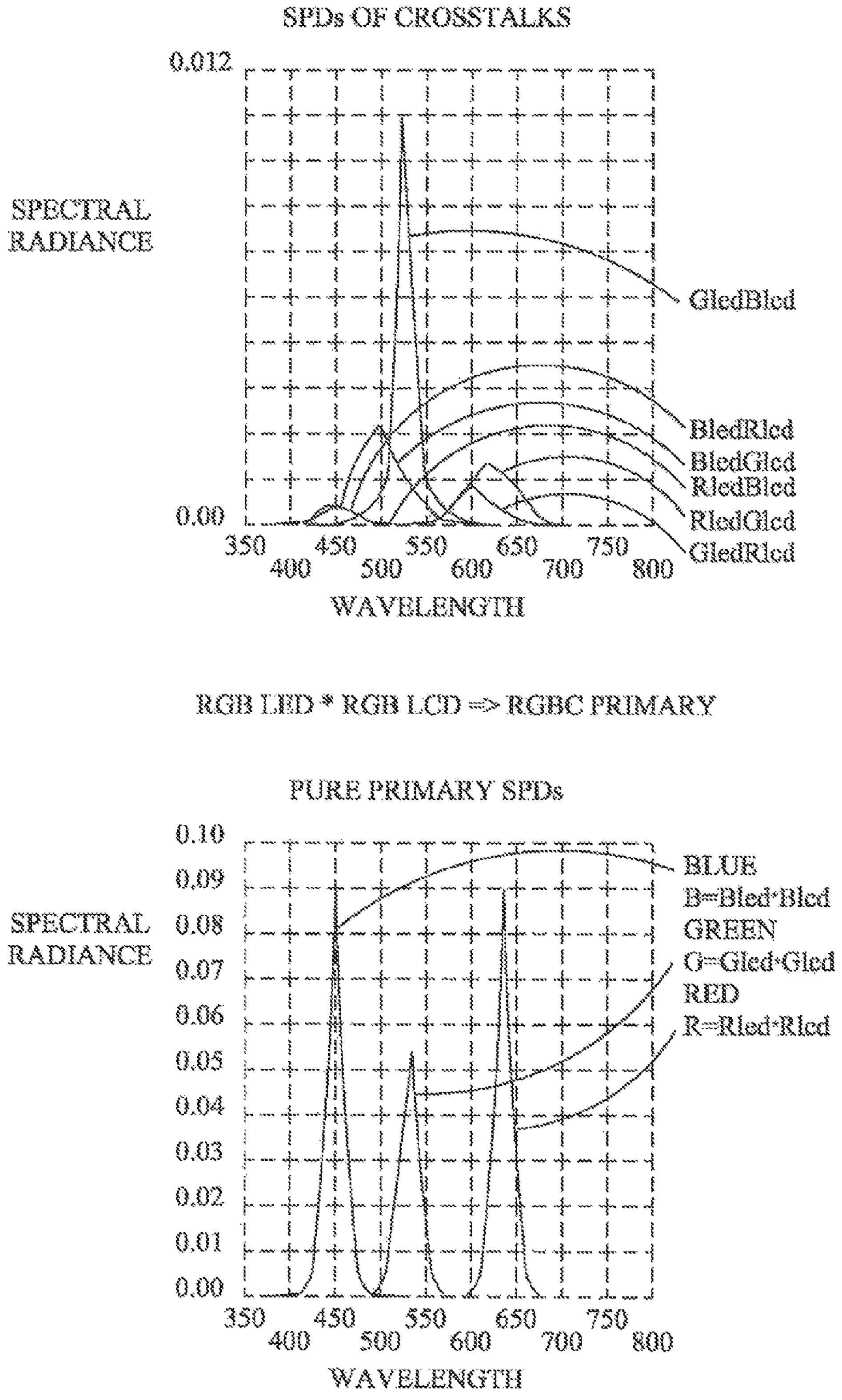
FIG. 2 illustrates the spectra of a display with RGB LED and RGB LCD.

The displayed image is the product of LED backlight and transmittance of LCD, referred to as $T_{LCD}(x,y)$. img(x,y)=bl(x,y)LCD(x,y)=(LED(i,j)*psf(x,y))LCD(x,y) (Equation 2). By combining the LED and LCD, the dynamic range of display is the product of the dynamic range of LED and LCD. For simplicity, one may use a normalized LCD and LED output to between 0 and 1. The use of red blue green (or other tri-color spectrum of a suitable type of light sources) LED further improves display in terms of the potential color gamut and possible power savings. For an example, if only the red color is displayed, both the green and blue LEDs can be off, which reduces both the power consumption and the leakage from green and blue light sources which lead to a pure color even at lower intensity. The same occurs for the other light sources. The display image may be represented as a function of wavelength (λ) and characterized as: img(x,y,λ)=bl(x,y,λ) LCD(x,y,λ) (Equation 3), where $bl(x,y,\lambda)=(LED_r(i,j,\lambda)+LED_g(i,j,\lambda)+LED_b(i,j,\lambda))*psf(x,y)$ $T_{LCD}(x,y,\lambda)=LCD_r(x,y,\lambda)+LCD_g(x,y,\lambda)+LCD_b(x,y,\lambda)$. The products of the RGB LED backlight and RGB LCD form nine distinct spectra, three primary spectra and six secondary spectra as shown in FIG. 2. The secondary spectra is the result of a backlight color (e.g., green backlight) passing through a color filter other than the color filter corresponding to the particular backlight color (e.g., not the green filter). In this manner, the spectra of one backlight light source is filtered by a filter for a different backlight light source, to provide a secondary spectra. Of the six secondary spectra, it turns out that the green LED to blue LCD is considerably larger than the other secondary spectra, with the other secondary spectra being relatively small in comparison. To reduce the computational requirements the other secondary spectra may be ignored. The use of three primary colors, together with an additional secondary spectra, only moderately increases the computational complexity of the system, while providing a substantially increased color gamut, and not requiring substantial increase in complexity associated with additional color filters or reduced sub-pixel apertures. Alternatively, the technique may incorporate one or more additional secondary spectra, as desired.

The resulting four primary spectra, including the crosstalk from the combination of the green LED together with the blue LCD filter, can be modeled as:

$$\begin{pmatrix} R \\ G \\ B \\ C \end{pmatrix} = \begin{bmatrix} LED_r & 0 & 0 \\ 0 & LED_g & 0 \\ 0 & 0 & LED_b \\ 0 & 0 & LED_g \end{bmatrix} \begin{bmatrix} LCD_r \\ LCD_g \\ LCD_b \end{bmatrix} \quad \text{Equation 4}$$

Both the LED values and LCD values can be independently modulated. Since the LED is at a much lower resolution, the LED values in Equation 4 are given by the convolution of the LED driving signal and the point spread function (PSF) of the LED. By utilizing the fourth crosstalk primary, the system may achieve a larger color gamut which as a result displays more real colors in the world, especially in the dark cyan area, as shown in FIG. 3.

The colorimetric model of the system may include a forward model that accepts RGBC input coordinates and predicts the output color tri-stimulus values XYZ (i.e., CIE color coordinates) produced by the system using a 3×4 rotation matrix with dark correction.

$$XYZ = \begin{bmatrix} X_R, X_G, X_B, X_C \\ Y_R, Y_G, Y_B, Y_C \\ Z_R, Z_G, Z_B, Z_C \end{bmatrix} * \begin{bmatrix} R \\ G \\ B \\ C \end{bmatrix} \quad \text{Equation 5}$$

Where X, Y and Z are dark corrected tri-stimulus values and the subscripts R, G, B and C represent for full red, full green, full blue, and the selected crosstalk.

The colorimetric model may include an inverse model that uses a single-pass technique to construct the inverse model, which turns an undetermined 3×4 inverse problem to several determined 3×3 transformations.

First, since the luminance gain is of importance to the rendered image quality, in order to utilize the luminance gain, the system may first determine whether the input falls inside RG'B (G' is combined primary of G and C, as is shown in FIG. 4 and calculated in Equation (6)) gamut or not, shown in Equation (7). If $RGB_1$ scalars are in the range of [0, 1], it means that the input is inside RG'B, and then RGB and C values may be directly calculated.

$$G' = G + C \quad \text{Equation 6}$$

$$RGB_1 = inv\left(\begin{bmatrix} X_R, X_G + X_C, X_B \\ Y_R, Y_G + Y_C, Y_B \\ Z_R, Z_G + Z_C, Z_B \end{bmatrix}\right) * XYZ \quad \text{Equation 7}$$

$$RGB = RG'B_1,\ C = G' \quad \text{Equation 8}$$

Second, if the color does not fall into the RG'B color gamut, then the system may determine whether the input is inside RGB color gamut or not. Similarly, if $RGB_2$ are within the range of [0, 1], then the input are inside the RGB color gamut (i.e., no crosstalk is necessary, if desired) and the RGBC may be calculated directly as illustrated in Equation (10).

$$RGB_2 = inv\left(\begin{bmatrix} X_R, X_G, X_B \\ Y_R, Y_G, Y_B \\ Z_R, Z_G, Z_B \end{bmatrix}\right) * XYZ \quad \text{Equation 9}$$

$$RGB = RGB_2,\ C = 0 \quad \text{Equation 10}$$

Third, if the input does not fall inside the RG'B or the RGB color gamut, then it falls into CGB color gamut and the system may use a single pass method to estimate suitable RGBC values. Initially, the system may calculate tri-stimulus value differences introduced by C, as shown in Equation 11 and Equation 12 (dXYZ may be considered a residual). Then GBC may be calculated by inverse matrix of GBC and then it is added back to RGB to determine RGBC values, as shown in Equation 13 and Equation 14. Also, if any of the values are out of range (e.g., greater than 1 or less than zero), they may be clipped back to 1 or 0 so they are at a boundary.

$$RGB_{imp} = inv\left(\begin{bmatrix} X_R, X_G + X_C, X_B \\ Y_R, Y_G + Y_C, Y_B \\ Z_R, Z_G + Z_C, Z_B \end{bmatrix}\right) * XYZ \quad \text{Equation 11}$$

-continued $$dXYZ = XYZ - \begin{bmatrix} X_R, X_G, X_B \\ Y_R, Y_G, Y_B \\ Z_R, Z_G, Z_B \end{bmatrix} * \min(1, \max(0, RGB_{tmp})) \quad \text{Equation 12}$$

$$GBC = inv\left(\begin{bmatrix} X_G, X_B, X_C \\ Y_G, Y_B, Y_C \\ Z_G, Z_B, Z_C \end{bmatrix}\right) * dXYZ \quad \text{Equation 13}$$

$$\begin{bmatrix} R \\ G \\ B \\ C \end{bmatrix} = \begin{bmatrix} RGB_{tmp}(1,\ :) \\ RGB_{tmp}(2,\ :) + GBC(1,\ :) \\ RGB_{tmp}(3,\ :) + GBC(2,\ :) \\ GBC(3,\ :) \end{bmatrix} \quad \text{Equation 14}$$

Accordingly, the system has the ability to differentiate between multiple different characteristics of the input values to provide better selection of appropriate color values and crosstalk values, if any.

In order to evaluate the performance of the reverse model, the RGBC scalar may be sampled at 0.25 intervals (altogether 625 groups of data) to be used as input RGBC. Its corresponding XYZ and Lab values are calculated accordingly. Then the inverse model is applied to transform XYZ to RGBC. After this, the X'Y'Z' and L'a'b' may be calculated and a color difference metric may be used to evaluate the difference between the input and the output predicted by the inverse model. The result is plotted in FIG. 5 and listed in Table 1.

TABLE 1

Color Difference Evaluation

| | Mean | Min | Max | Std. |
|---|---|---|---|---|
| CIEDE2000 | 0.016 | 0 | 0.72 | 0.08 |

To render RGBC to $RGB_{LED}$ and $RGB_{LCD}$ since C is a dependent crosstalk primary, the system does not have independent control of C. In order to achieve a suitable C, the system has four degrees of freedoms, which are $G_{LED}$, $G_{LCD}$, $B_{LED}$ and $B_{LCD}$. A suitable rendering technique is illustrates in FIG. 6.

A set of device independent set of values (i.e., X, Y, Z) 600 representative of an image to be displayed are converted to a RGBC image 610. Preferably, the conversion to the image 610 is performed by using Equation 14.

The backlight values are selected so that suitable crosstalk will be provided, as desired. The image 610 is sub-sampled 620 to the LED resolution, which is typically lower in resolution. The result of the sub-sampling is an image representative of the spatial distribution of the backlight 630. There exist special cases that may be accounted for, if desired. The first set of special cases is when C is inside the region defined by CGB 640. For this special case 650, defined in table 2 rows 1 and 2 where $B_{LED}$ is zero, the essence is to use the $B_{LCD}$ for the cross talk term since the $B_{LED}$ is zero. Otherwise, table 2 row 3 is used.

The second set of special cases 660, defined in table 2 row 4 and 5, is when C is outside the region defined by CGB, but within the RGB gamut. The green and blue LEDs, i.e., $G_{LED}$ and $B_{LED}$, are adjusted 670 accordingly.

In either case, the LED image is up-sampled 680 to LCD resolution, thereafter, the LCD image 690 may be determined by division between input R, G, B 610 and $R_{LED,BL}$, $G_{LED,BL}$ and $B_{LED,BL}$ 680. If B=0 and C>0, then $B_{LCD}$ may be adjusted 700.

TABLE II

| Techniques To Determine C Under Different Cases | | |
|---|---|---|
| C is inside CGB color gamut | | |
| | At LED resolution | At LCD resolution |
| G = B = 0, C > 0 | $G_{LED}$ = sub Im g2BL($C_{img}$) | $B_{LCD} = C_{img}/G_{LED}$ |
| B = 0, G, C > 0 | $RGB_{LED}$ = sub Im g2BL($RGB_{img}$) | $B_{LCD} = C_{img}/G_{LED}$ |
| G ≥ 0, B, | $RGB_{LED}$ = sub Im g2BL($RGB_{img}$), | $RGB_{LCD} = RGB_{img}/RGB_{LED}$ |
| C > 0 | $B_{LCD} = B/B_{LED}$, $G_{LED} = C_{img}/B_{LCD}$. When $G_{LED} > 1$, need to change $B_{LED}$ as well: $G_{LED} = 1$, so $B_{LCD} = C$, $B_{LED} = B/B_{LCD}$. | |
| C is outside CGB color gamut | | |
| At LED resolution | $B_{LED} = B_{LED}$ + psf*(0.25 + 0.5*$B_{LED}$) | |
| At LCD resolution | $G_{LCD}$ = min(1,max(0, $G_{LCD}$ − LCDLED.gLED2bLCD*($B_{LCD} - G_{LCD}$))) | |

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method of illuminating a display comprising the steps of:

(a) spatially varying the luminance of a multi-colored light source illuminating a plurality of pixels of said display in response to receiving a plurality of pixel values;

(b) varying the transmittance of a light valve of said display having filters corresponding to said multi-colored light source in response to receiving said plurality of pixel values;

(c) modifying the illumination from said display for said plurality of pixel values based upon modification of said luminance of said light source and said varying said transmittance of said light valve;

(d) wherein said modifying modifies at least one of said multi-colored light sources and modifies the transmittance of at least one said light valve associated with a filter of a different color than a modified said at least one of said multi-colored light sources, and using a technique that expressly models crosstalk of said at least one of said multi-colored light sources in combination with said transmittance of said at least one light valve associated with a filter of a different color than a modified said at least one of said multi-color light sources, in such a manner that increases the color gamut of said display and increases the crosstalk of said display, where the crosstalk is modeled in a color space that includes a crosstalk primary C defined by $$\begin{pmatrix} R \\ G \\ B \\ C \end{pmatrix} = \begin{bmatrix} LED_r & 0 & 0 \\ 0 & LED_g & 0 \\ 0 & 0 & LED_b \\ 0 & 0 & LED_g \end{bmatrix} \begin{bmatrix} LCD_r \\ LCD_g \\ LCD_b \end{bmatrix}.$$

2. The method of claim 1 wherein said crosstalk is modeled in a CIE color space based upon the crosstalk primary C.

3. The method of claim 2 wherein said method uses a model of crosstalk that includes a combined primary of C and another primary different than C.

4. The method of claim 3 wherein said another primary is the green primary.

5. The method of claim 2 wherein said method uses a model that calculates a residual based upon tri-stimulus value differences introduced by the crosstalk primary C.

6. The method of claim 5 wherein said model adds RGB values to the product of said residual with a GBC primary matrix.

7. The method of claim 1 further including a colorimetric model using a single-pass technique.

8. The method of claim 1 wherein a green light source and a light valve associated with a blue filter are each modified, and where the system determines whether an input is inside a particular color region or outside said particular color region for the modification of said green light source and said transmittance associated with said blue filter.

9. The method of claim 8 wherein said input is within said particular color region then said selection of said green light source and said transmittance associated with said blue filter is determined in a first manner.

10. The method of claim 8 wherein said input is outside said particular color region then said selection of said green light source and said transmittance associated with said blue filter is determined in a second manner.

11. A method of illuminating a display comprising the steps of:

(a) spatially varying the luminance of a light source having red, green, and blue elements and illuminating a plurality of pixels of said display in response to receiving a plurality of pixel values;

(b) varying the transmittance of a light valve of said display in response to receiving said plurality of pixel values, the light valve having associated red, green, and blue filters;

(c) modifying the illumination from said display for said plurality of pixel values based upon modification of said luminance of said light source and said varying said transmittance of said light valve;

(d) wherein said modifying modifies at least one of said multi-colored light sources and modifies the transmittance of at least one said light valve associated with a filter of a different color than a modified said at least one of said multi-colored light sources, and using a technique that expressly models crosstalk of said at least one of said multi-colored light sources in combination with said transmittance of said at least one light valve associated with a filter of a different color than a modified said at least one of said multi-color light sources, in such a manner that increases the color gamut of said display and increases the crosstalk of said display; where (e) the system determines whether an input is inside a particular color region or outside said particular color region for the modification of a green light element and said transmittance associated with said blue filter.

12. The method of claim 11 wherein if said input is within said particular color region then said selection of said green light element and said transmittance associated with said blue filter is determined in a first manner.

13. The method of claim 11 wherein if said input is outside said particular color region then said selection of said green light element and said transmittance associated with said blue filter is determined in a second manner.

14. The method of claim 11 wherein the crosstalk is modeled in a color space that includes a crosstalk primary C defined by $$\begin{pmatrix} R \\ G \\ B \\ C \end{pmatrix} = \begin{bmatrix} LED_r & 0 & 0 \\ 0 & LED_g & 0 \\ 0 & 0 & LED_b \\ 0 & 0 & LED_g \end{bmatrix} \begin{bmatrix} LCD_r \\ LCD_g \\ LCD_b \end{bmatrix}.$$

15. The method of claim 14 wherein said crosstalk is modeled in a CIE color space based upon the crosstalk primary C.

16. The method of claim 15 wherein said method uses a model of crosstalk that includes a combined primary of C and another primary different than C.

17. The method of claim 16 wherein said another primary is the green primary.

18. The method of claim 15 wherein said method uses a model that calculates a residual based upon tri-stimulus value differences introduced by the crosstalk primary C.

19. The method of claim 18 wherein said model adds RGB values to the product of said residual with a GBC primary matrix.

* * * * *